(12) United States Patent
Haikola et al.

(10) Patent No.: US 7,756,552 B2
(45) Date of Patent: Jul. 13, 2010

(54) HOLDING DEVICE FOR A CELLULAR PHONE

(75) Inventors: Pasi Haikola, Espoo (FI); Hans-Peter Goedert, Ulm (DE); Oliver Diener, Wernau (DE); Marcus Anlauff, Braunschweig (DE)

(73) Assignee: Nokia Corporation, Espoo (FI)

( * ) Notice: Subject to any disclaimer, the term of this patent is extended or adjusted under 35 U.S.C. 154(b) by 466 days.

(21) Appl. No.: 10/599,001

(22) PCT Filed: May 12, 2005

(86) PCT No.: PCT/IB2005/001283

§ 371 (c)(1), (2), (4) Date: Sep. 18, 2006

(87) PCT Pub. No.: WO2005/118344

PCT Pub. Date: Dec. 15, 2005

(65) Prior Publication Data

US 2007/0197271 A1    Aug. 23, 2007

(30) Foreign Application Priority Data

May 27, 2004    (DE)    .................. 20 2004 008 423 U

(51) Int. Cl.
    *H04M 1/00*    (2006.01)
(52) U.S. Cl. .............. 455/569.2; 455/569.1; 455/575.9; 455/575.1
(58) Field of Classification Search .............. 455/569.1, 455/575.1, 575.8, 575.9, 569.2; 379/455, 379/446

See application file for complete search history.

(56) References Cited

U.S. PATENT DOCUMENTS

| 4,056,696 | A |   | 11/1977 | Meyerle et al. |
| 5,282,246 | A | * | 1/1994  | Yang ........................... 379/455 |
| 5,825,874 | A | * | 10/1998 | Humphreys et al. ......... 379/446 |
| 5,907,796 | A | * | 5/1999  | Matchett et al. .......... 455/575.9 |
| 6,049,725 | A | * | 4/2000  | Emmert et al. .............. 455/573 |

(Continued)

FOREIGN PATENT DOCUMENTS

EP    1055562 A2    11/2000

(Continued)

OTHER PUBLICATIONS

International Search Report for PCT/IB2005/001283 dated Sep. 26, 2005.

*Primary Examiner*—Nick Corsaro
*Assistant Examiner*—Sarwat Chughtai
(74) *Attorney, Agent, or Firm*—Alston & Bird LLP

(57) ABSTRACT

Disclosed is a holding device for a cellular phone (100), comprising a holding surface (215), a top holding rail (220, 435) that is spaced apart from the holding surface (215), and a pressing unit (300, 450). Said pressing unit (300) encompasses an elastic pressing element (340) which can apply a holding force ($F_{hold}$) extending parallel to the longitudinal axis of the cellular phone (100) to a base region (107) of the cellular telephone (100) such that a top region (106) of the cellular phone (100) is pressed against the top holding rail (220, 435). Said top holding rail (220, 435) and a bottom holding rail (260, 436) are provided for securing the cellular telephone (100) against a transversal force on the holding surface (215).

14 Claims, 3 Drawing Sheets

U.S. PATENT DOCUMENTS

Figure 2B:
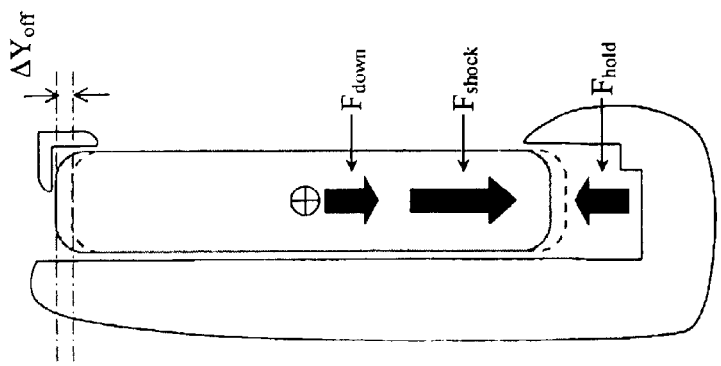

| | | | |
|---|---|---|---|
| 6,603,959 B1 * | 8/2003 | Peiker | 455/575.1 |
| 6,775,561 B1 * | 8/2004 | Peiker | 455/569.1 |
| 6,785,567 B2 * | 8/2004 | Kato | 455/575.9 |
| 2004/0097272 A1 * | 5/2004 | Schuffert | 455/569.1 |
| 2005/0090301 A1 * | 4/2005 | Lange et al. | 455/575.8 |

FOREIGN PATENT DOCUMENTS

| | | | |
|---|---|---|---|
| GB | 2261571 A | * | 5/1993 |
| JP | 62094448 | | 4/1987 |

* cited by examiner

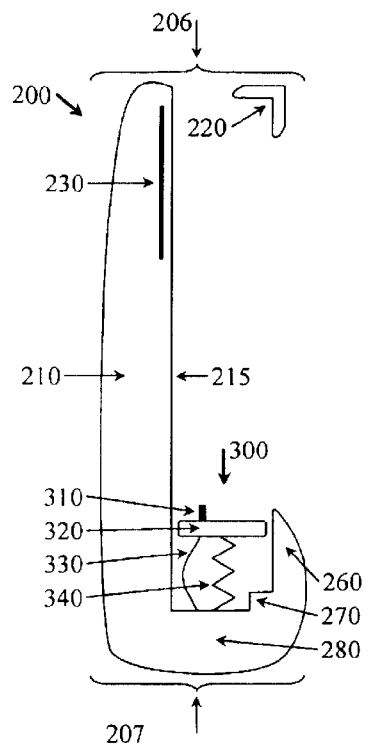
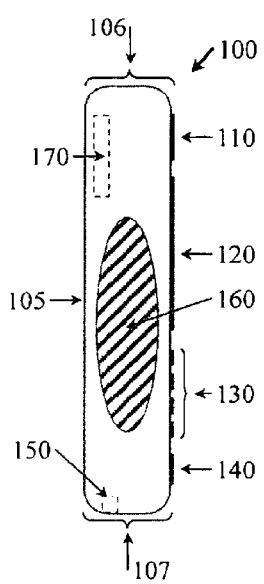
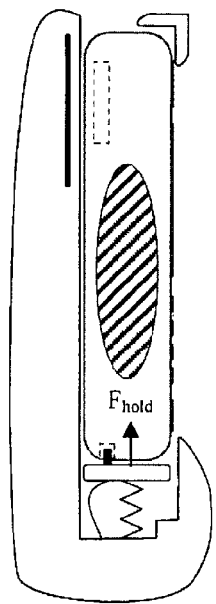
Fig. 1a  Fig. 1b
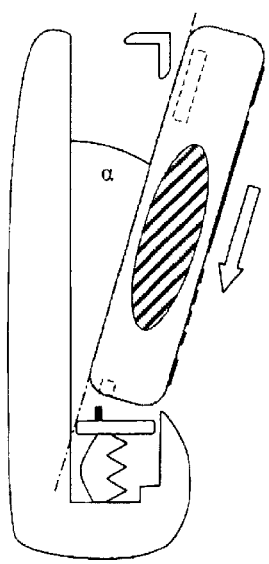
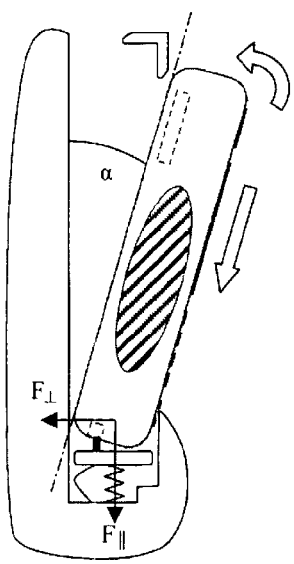
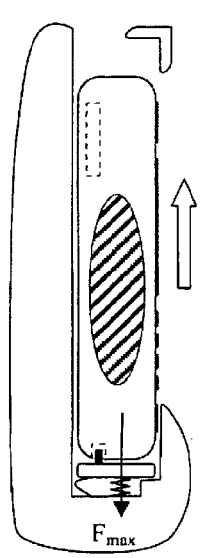
Fig. 1c  Fig. 1d  Fig. 1e

HOLDING DEVICE FOR A CELLULAR PHONE

BACKGROUND OF THE INVENTION

1. Field of the Invention

The invention relates to a holding device for a mobile telephone, in particular a holding device which is suitable for installation in a motor vehicle.

2. Description of Related Art

Holders or holding devices for mobile telephones are preferably used in motor vehicles in order, on the one hand, to hold the mobile telephones securely and, on the other hand, to provide electrical contact of the mobile telephones with handsfree sets installed in the motor vehicles and with external antennas provided on the motor vehicles. Holding devices of the type described above must meet numerous general requirements which relate essentially to their ability to be handled by the user, the mechanical reliability of the holding devices, the holding properties of the mobile telephone, and the reliability of the electrical contacting.

The mechanical reliability relates to, in particular, the necessary robustness of the holding device. Thus, the holding device should be designed in such a manner that it can withstand numerous handling processes by the user. Furthermore, the holding device should withstand in a suitable manner the stresses on it which are caused by the operation of the motor vehicle in which the holding device is installed, in particular, vibrations due to use of the motor vehicle but also stresses of acceleration which can occur during traffic accidents.

In principle, the mechanical connection between the holding device and the mobile telephone under the action of the stresses described above must also be ensured by suitable design of the holding properties. On the other hand, the holding properties also affect the ability to handle the mobile telephone since they, for example, have to be overcome during disengagement of the mobile telephone from the holding device.

Electrical contacting between components which are installed in the motor vehicle and the mobile telephone, which provides a corresponding interface for the contacting, must be provided reliably. In so doing, the previously described stresses due to the operation of the motor vehicle must be taken into account. The electrical contacting should in addition also take place without faults after a plurality of actuations, i. e. insertion or withdrawal processes.

The ability to handle the mobile telephone relates in particular to stresses which necessarily occur due to actuation of the holding device for a particular purpose.

There are numerous different holding devices for mobile telephones which are available on the market and which are based on different technological approaches to their realization.

EP 1 055 562 B1 describes, for example, a holding device which provides a tray for accommodating a mobile telephone. Fixation pins, which are provided on the tray and engage in receptacles which are provided at suitable points of the housing of the mobile telephone, serve, in connection with a carriage, for the fixation of the mobile telephone in the tray. Due to the type of fixation described, the handling of the insertion and withdrawal is not simple, in particular if the user has only one free hand available. Furthermore, the receptacles in the housing of the mobile telephone entail, for the fixation pins of the holding device, a predetermined configuration of the housing of the mobile telephone. The receptacles in the housing are expensive and the configuration of the mobile telephone is restricted by the receptacles to be provided.

BRIEF SUMMARY OF THE INVENTION

The objective of the present invention is to provide a holding device which is easy to handle and which also meets the conceptual requirements described above in a holding device for installation in a motor vehicle.

The objective is realized by the features of claim 1.

The holding device according to the invention for a mobile telephone comprises at least one holding surface, a head-holding bracket spaced from the holding surface, and a pressing unit. The pressing unit furthermore comprises an elastic pressing element which is adapted to a foot area of the mobile telephone to exert a holding force parallel to the longitudinal axis of the mobile telephone. Through the holding force, a head area of the mobile telephone can be pressed against the head-holding bracket. The head-holding bracket and a foot-holding bracket are furthermore provided to secure the mobile telephone against a force applied in the transverse direction, i. e. a direction essentially perpendicular with respect to the holding surface.

According to one form of embodiment of the invention, for the insertion of the mobile telephone into the holding device, a displacing force can be exerted on the pressing unit by the mobile telephone at an acute angle. The pressing unit is displaced by the displacing force and the action of a restoring force. The angle is defined by the holding surface and the longitudinal axis of the mobile telephone. The restoring force results from the displacement of the pressing element of the pressing unit, said pressing element having elastic properties.

According to one form of embodiment of the invention the pressing unit can be displaced by a predetermined displacement by the mobile telephone guided at the acute angle and can, on reaching the predetermined displacement, be pivoted into the holding device by a pivoting motion.

According to one form of embodiment of the invention the pressing unit, without the action of a force on it, is in a neutral position which is defined by properties of the pressing element, i. e. its length in particular. The pressing unit in the neutral position and the head-holding bracket are spaced from one another by a predetermined length. The predetermined length corresponds to an extension of the mobile telephone in the longitudinal direction less a predetermined difference in length. The displacement of the pressing unit by the predetermined difference in length causes the holding force.

According to one form of embodiment of the invention the head-holding bracket has a level which is defined in the longitudinal direction of the holding device or parallel with respect to the holding surface. The level is significantly less than the predetermined displacement.

According to one form of embodiment of the invention the pressing element (340) is adapted, in case of an impact which can be transmitted from the holding device to the inserted mobile telephone, to react elastically by the pressing unit being displaced by the mobile telephone as a consequence of the action of a force resulting from the impact. The impact is thereby dampened and the mobile telephone thus experiences the impact only in a weakened form.

According to one form of embodiment of the invention the pressing unit comprises a contact unit which is adapted to couple electrically with a corresponding contact unit of the mobile telephone.

According to one form of embodiment of the invention the pressing unit furthermore comprises a flexible circuit board conductor which is connected to the contact unit. The circuit board conductor preferably comprises one or more electrical conductors which are connected to individual contacts of the contact unit of the holding device.

According to one form of embodiment of the invention the elastic pressing element of the pressing unit has essentially the elastic properties of a spring.

According to one form of embodiment of the invention the holding device is configured in such a manner that gripping surfaces of the mobile telephone are disposed on the side and freely accessible when it is inserted into the holding device.

According to one form of embodiment of the invention the holding device comprises a coupling unit which is suitable for a capacitive and/or inductive coupling of high-frequency signals with an antenna of the mobile telephone.

According to one form of embodiment of the invention the holding device is made of multiple parts and comprises at least one annular holder. The annular holder comprises at least the head-holding bracket and is formed, in a plan view, essentially in the form of a frame.

According to one form of embodiment of the invention the annular holder has, in a side view, an essentially U-shaped or V-shaped form.

According to one form of embodiment of the invention the annular holder comprises the foot-holding bracket.

According to one form of embodiment of the invention the holding device is composed of individual components. For this, the components comprise at least one main tray with a receptacle for a coupling unit and with a receptacle for a foot tray, the coupling unit, a coupling holder, the pressing unit, and the annular holder.

Further details and forms of embodiment of the invention will be described with reference to the schematic representations. Shown therein are

BRIEF DESCRIPTION OF THE SEVERAL VIEWS OF THE DRAWING(S)

Figure 2A:
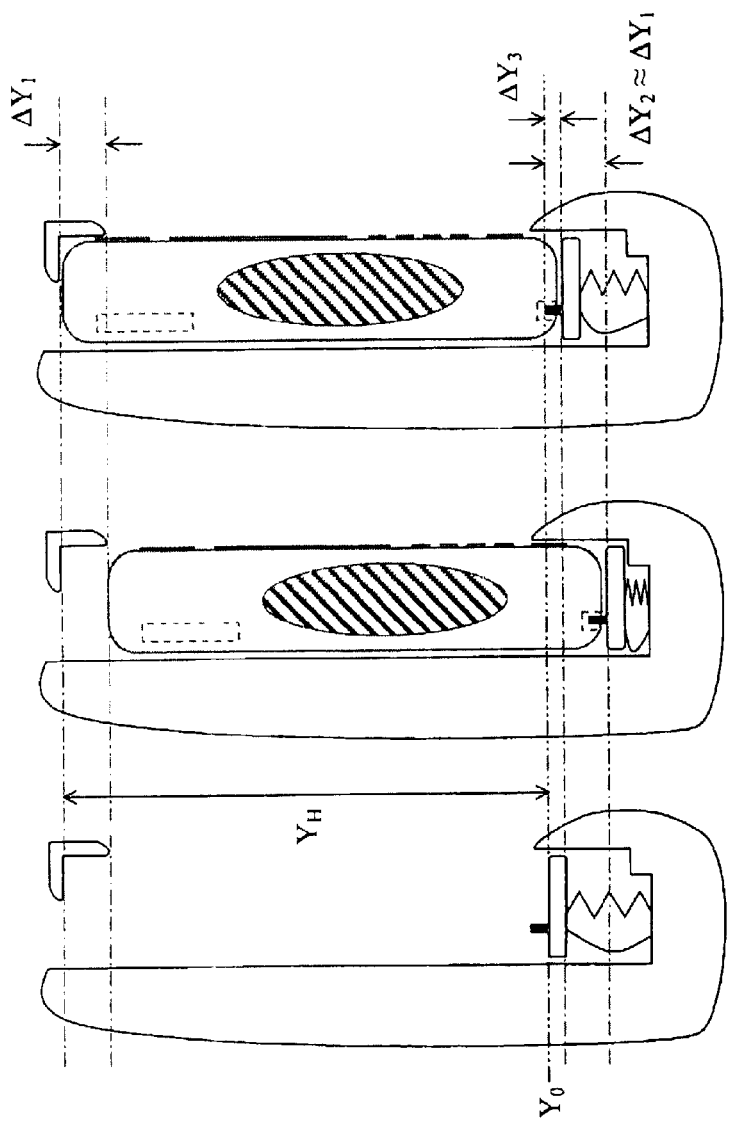
Figure 3:
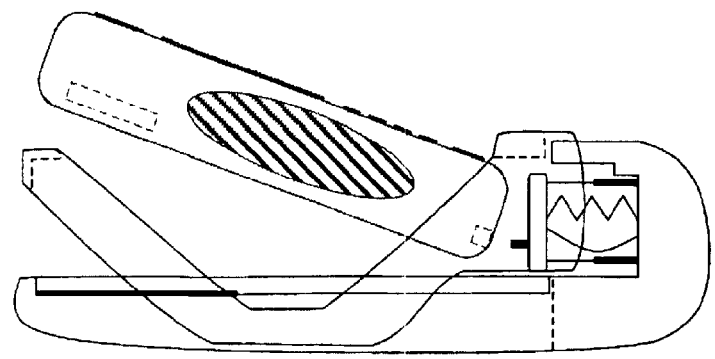
Figure 3:
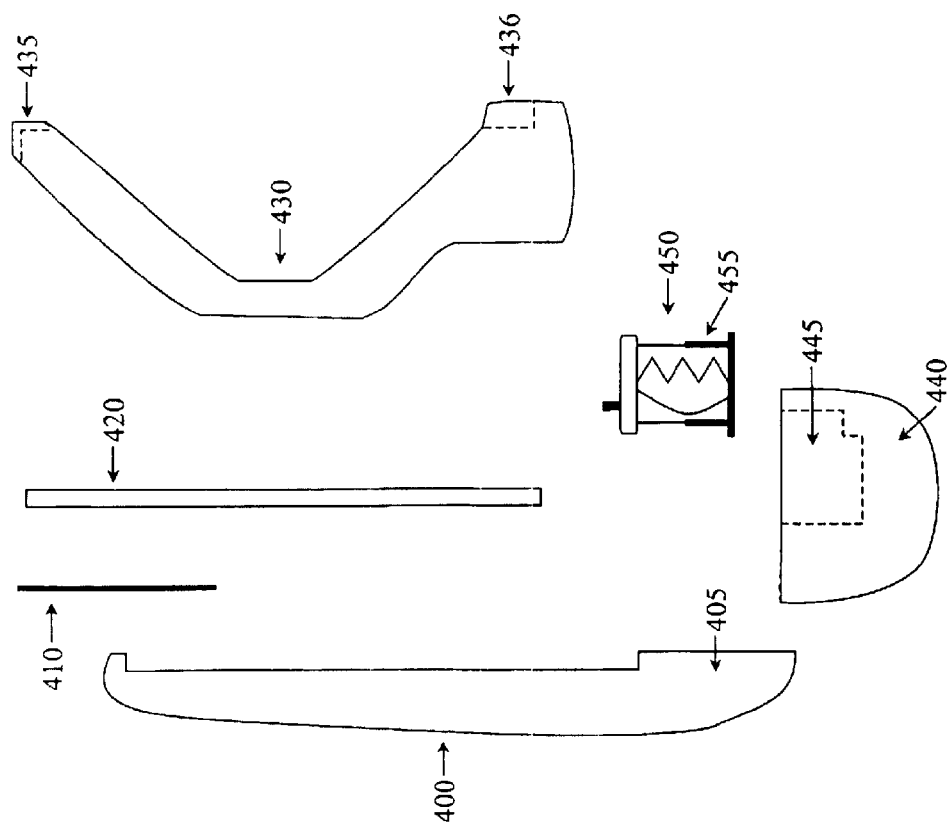

FIG. 1a in a sectional view along a longitudinal axis, a holding device according to one form of embodiment of the invention and suitable to receive a mobile telephone;

FIG. 1b the holding device according to FIG. 1a in which the mobile telephone is inserted;

FIG. 1c-1e a insertion process of the mobile telephone into the holding device according to FIG. 1a;

FIG. 2a determinative variables for the function of the holding device according to FIG. 1a;

FIG. 2b a displacement of the mobile telephone in the holding device as a consequence of an impact transmitted by the motor vehicle; and FIG. 3 another holding device according to one form of embodiment of the invention and based on the same principles as the holding device illustrated schematically in FIG. 1a.

DETAILED DESCRIPTION OF THE INVENTION

In FIG. 1a a holding device according to one form of embodiment of the invention is shown in a sectional representation. The holding device 200 is composed functionally of a main tray 210, a head-holding bracket 220 in the head area 206 of the holding device 200, a foot tray 280, and a foot-holding bracket 260 in the foot area 207 of the holding device 200. The main tray 210 with its holding surface 215 is configured to receive the mobile telephone 100. In particular, the holding surface 215 is formed so as to be congruent to the rear surface 105 of the housing of the mobile telephone 100. The foot tray 280, working together with the foot-holding bracket 260, is formed to accommodate a pressing unit 300. The pressing unit 300 comprises a pressing surface 320 with a contact unit 310 and an elastic pressing element 340. The contact unit 310, which is provided, for example, as a multi-point connecting plug with one or more electric contacts, is connected to a flexible circuit board conductor 330, e. g. a printed circuit board conductor, which comprises one electrical conductor, or several electrical conductors, each of which is electrically coupled with the individual (electrical) contacts of the contact unit 310. The foot tray 280 comprises in addition a limiting element 280 which serves to limit the displacement of the pressing unit 300.

The elastic pressing element 340 of the pressing unit 300 makes possible a linear displacement of the pressing surface 320 essentially parallel to the holding surface 215. Through the action of a force on the pressing surface 320 of the pressing unit 300 in the direction towards the foot area 207, a displacement of the pressing surface 320 essentially parallel to the holding surface 215 is obtained. In that displacement, the action of a force acts against a restoring force which is obtained by a compression of the elastic pressing unit 340 as a consequence of the displacement of the pressing surface 320. Preferably, the elastic pressing element 340 has the elastic properties of a spring, i. e. the restoring force is preferably proportional to the displacement of the pressing surface 320. Alternatively however, constant or non-proportional elastic properties between the displacement and the resulting restoring force are also conceivable. The elastic pressing element 340 can, for example, be formed as a spring element. The pressing surface 320 is located, according to the elastic properties of the pressing element 340, in a resting position or neutral position. The neutral position is designated and represented in FIG. 2a as $Y_0$.

The mobile telephone 100 is represented schematically in a side view in FIG. 1a. The mobile telephone comprises, in conformity with FIG. 1a, a rear surface 105 of the housing and a front surface of the housing, said front surface comprising in a schematic representation an earpiece or a loud speaker 110, a display 120, a keypad 130 (for example, an ITU-T keypad), and a mouthpiece or microphone 140. An upper end 106 or a head area 106 and a lower end 107 or a foot area 107 of the mobile telephone is defined relative to the above-described functional elements of the mobile telephone 100. That is, the head area 106 of the housing of the mobile telephone is preferably defined in the area of the earpiece 110 while the foot area 107 of the housing of the mobile telephone is preferably defined in the area of the mouthpiece. Alternatively, a mobile telephone with a foldable housing can also be used. In the framework of the description it should be understood that the head area 106 of the mobile telephone implemented so as to be foldable is preferably defined in the area of the hinge, which makes possible the folding of the housing and the foot area of the mobile telephone implemented so as to be foldable is preferably defined at the opposite longitudinal end.

The mobile telephone 100 furthermore comprises gripping surfaces 160 disposed on the side, said gripping surfaces being used, in the framework of the present invention, in manual handling by the user. In addition, an antenna 170 of the mobile telephone is indicated in FIG. 1a, said antenna preferably being disposed as an internal antenna in the housing of the mobile telephone. Furthermore, the mobile telephone 100 comprises a contact unit 150. In said mobile telephone the contact unit 150 of the mobile telephone is formed to conform with the contact unit 310 of the holding device so that the contact unit 150 and the contact unit 310 engage in one another in such a manner that they fit precisely and the individual electrical contacts of the contact unit 150 and 310 can make electrical contact with one another.

In addition, a coupling unit 230 is provided in the holding device, said coupling unit being adapted for the inductive and/or capacitive coupling of high-frequency signals with the antenna 170 of the mobile telephone 100. High-frequency signals which are produced by the mobile telephone 100 in order to be radiated through the antenna 170 of the mobile telephone 100 couple inductively and/or capacitively into the coupling unit 230 and are conducted further from it to an external antenna (not shown). Conversely, high-frequency signals which are received by the external antenna can be coupled, with the aid of the coupling unit 230, into the antenna 170 of the mobile telephone 100. The coupling unit 230 is suitable to replace a typical antenna connection by means of a coaxial plug-in contact.

FIG. 1b shows, in schematic form, the holding device 200 with a mobile telephone 200 [sic] inserted. As can be seen, the rear surface 105 of the housing of the mobile telephone and the holding surface 215 of the holding device 200 lie directly opposite one another. Preferably, the surface 105 of the housing and the holding surface 215 abut one another. The housing of the mobile telephone 100 is clamped between the pressing surface 320 of the pressing unit 300 and the head-holding bracket 220 of the holding device 200. On one side, the head-holding device 220 supports the head area of the mobile telephone housing in the direction of the head area 206 of the holding device 200, i. e. in a direction essentially parallel to the holding surface 215 and opposite to the pressing unit 300. On the other side, the head-holding device 200 supports the head area 106 of the mobile telephone housing in the direction of the front surface of the housing of the mobile telephone, i. e. in a direction perpendicular and opposite to the holding surface 215. The free distance $Y_H$ between the pressing surface 320 in the neutral position and the head-holding bracket 220 is shortened with respect to the longitudinal extension or the length of the housing of the mobile telephone by a predetermined difference, $\Delta Y_3$, in the distance. The free space $Y_H$ and the difference, $\Delta Y_3$, in the distance are illustrated in FIG. 2a. The inserted mobile telephone 100 causes a displacement of the pressing surface 320 by the predetermined difference, $\Delta Y_3$, in the distance so that the elastic pressing element 340, according to its spring-like elastic properties, causes, through the pressing surface 320, a restoring force $F_{hold}$ on the foot area 107 of the mobile telephone. As a consequence of the restoring force $F_{hold}$ acting on the mobile telephone housing, the mobile telephone housing is, as described above, pressed against the head-holding bracket 220 in the direction opposite to the displacement, $\Delta Y_3$, with respect to the neutral position $Y_0$. The restoring force, i. e. the force resulting from the difference, $\Delta Y_3$, in the distance, in connection with the elastic properties of the pressing element 340, defines the holding force of the mobile telephone in the holding device 200.

The foot-holding bracket 260 serves on one side to guide the mobile telephone during the insertion process and on the other side to support the foot area 107 of the mobile telephone housing in a direction opposite to the holding surface 215.

Not shown are lateral guides which support the mobile telephone against transverse displacement parallel to the holding surface 215 and perpendicular to the longitudinal axis of the mobile telephone 100. The lateral guides can be disposed in spatial conformity with the foot area 107 of the mobile telephone 100 inserted into the holding device 200 and in spatial conformity with the head area 106 of the mobile telephone 100 inserted into the holding device 200. That is, suitable lateral guides can be provided in the area of the head-holding bracket 220 and the foot-holding bracket 260.

The head area 206 of the holding device 200 and the head area 106 of the mobile telephone 100 or the foot area 207 of the holding device 200 and the foot area 107 of the mobile telephone 100 are spaced nearest to one another according to the representation in FIG. 1b.

The coupling unit 230 of the holding device should be disposed in suitable spatial conformity with the antenna 170 of the mobile telephone 100 inserted into the holding device 200.

In the following, the insertion process of the mobile telephone 100 will be presented schematically with reference to FIGS. 1c to 1e. The insertion of the mobile telephone 100 is done by manual handling of the mobile telephone 100, whose user preferably handles the mobile telephone 100 by gripping, with her/his index finger and thumb of one hand, the gripping surfaces 160 disposed on the side. For this, the holding device 200 is formed in such a manner that, disposed on the side, the gripping surfaces 160 of the mobile telephone 100 are freely accessible and remain so during the entire insertion process. In the framework of the following description, reference is made to FIG. 2a. The relevant dimensions and displacements are represented in addition.

Referring to FIG. 1c, the foot area 107 of the mobile telephone 100 is first introduced into the holding device 200 in the direction of the pressing surface 320. For this, the mobile telephone 100 is tilted at an angle $\alpha$ which is defined by the holding surface 215 and the rear surface 105 of the housing of the mobile telephone 100 or its longitudinal axis. The line of intersection of the holding surface 215 and the rear surface 105 of the housing lies in the plane which is defined by the holding surface 215 or which is defined by the rear surface 105 of the housing. The angle $\alpha$ between the holding surface 215 and the rear surface 105 of the housing is preferably acute. The angle $\alpha$ is furthermore preferably bounded below by the distance of the head-holding bracket 220 to the holding surface 215.

The introduction of the mobile telephone 100 into the holding device 200 in the direction of the pressing surface 320 is supported by the foot-holding bracket 260, which, working together with the holding surface 215 guides the foot area 107 of the mobile telephone in the direction of the pressing surface 320. The mobile telephone is guided by the user in the direction of its longitudinal axis, which, as described above, is tilted at an angle $\alpha$ with respect to the holding surface 215. Setting the mobile telephone at an angle is prevented by the guiding action of the foot-holding bracket 260 and the holding surface 215. The guiding of the foot-holding bracket 260 and the holding surface 215 furthermore acts in a supporting manner on the tilting of the mobile telephone 100 by the angle $\alpha$. That is, the guiding elements can be formed in such a manner that the suitable angle $\alpha$ is established automatically.

The guiding effect of the foot-holding bracket 260 and the holding surface 215 furthermore supports a guiding together of the contact unit 150 of the mobile telephone 100 and the contact unit 310 which is disposed on the pressing unit 300 or the pressing surface 320.

Referring to FIG. 1d, the mobile telephone 100 is guided by the user in the direction of this longitudinal axis so that by means of its foot area 107 the pressing surface is displaced by the user in the direction towards the foot area 207 of the holding device 200 under the action of a force. The force acting at an angle $\alpha$ on the pressing surface, said force being exerted by the user in guiding the mobile telephone 100, has one component $F_\parallel$ essentially perpendicular to the holding surface 215 on which it is incident, and one component $F_\parallel$ on the pressing surface 320 and essentially parallel to the holding surface 215 or essentially perpendicular to the pressing surface 320. The action of a force $F_\parallel$ on the pressing surface 320 acts against the pressing element 340 and causes a displacement of the pressing surface 320 from the neutral position $Y_0$ in the direction of the action of a force $F_\parallel$, i. e. in the direction of the foot area 207 of the holding device 200.

The mobile telephone 100 is guided by the user in the direction of its longitudinal axis until a predetermined displacement $\Delta Y_2$ of the pressing surface 320 is reached. The predetermined displacement $\Delta Y_2$ is defined essentially by the level $\Delta Y_1$ of the head-holding bracket 220 in the direction parallel with respect to the holding surface 215. As soon as the predetermined displacement $\Delta Y_2$ of pressing surface 320 is reached, the user can reduce the angle $\alpha$ by a pivoting motion of the head area 106 of the mobile telephone 100 so that finally the rear surface 105 of the housing of the mobile telephone 100 and the holding surface 215 of the holding device 200 are essentially parallel to one another. Due to the pivoting motion of the mobile telephone 100, the maximum radius of the pivot circle which the mobile telephone 100 describes during the pivoting motion must also be taken into account along with the level $\Delta Y_1$ of the head-holding bracket 220 for the required displacement $\Delta Y_2$ of the pressing surface 320.

During the pivoting motion, the force $F_{max}$ required for the displacement $\Delta Y_2$ of the pressing surface is maintained by the user. FIG. 1c [sic] shows the mobile telephone 100 which is completely pivoted into the holding device 200. With reduction of the force required for the displacement $\Delta Y_2$ of the pressing surface, the elastic pressing element 340 causes, by means of the pressing surface 320, a displacement of the mobile telephone 100 in the direction towards the heading-holding bracket 220 or in the direction towards the head area 207 of the holding device 200. In said displacement, the mobile telephone 100 is preferably guided by the holding surface 215 which the rear surface 105 of the housing of the mobile telephone 100 abuts.

Because of the free distance $Y_H$ between the pressing surface 320 in the neutral position and the head-holding bracket 220, said free distance being shortened with respect to the longitudinal extension or the length of the housing of the mobile telephone by the predetermined difference, $\Delta Y_3$, in the distance, the pressing surface 320 returns to the position displaced with respect to the neutral position by the predetermined difference, $\Delta Y_3$, in the distance. This is described above with reference to FIG. 1b.

Due to the preferred spring-like elastic properties of the pressing element 340, the force required for the displacement of the pressing surface must be increased by the user in proportion to the size of the displacement $\Delta Y$. The maximum force $F_{max}$ required for the displacement is required with the maximum displacement $\Delta Y_2$ of the pressing surface 320.

It is to be noted that the reader who is so inclined can also derive, on the basis of the above-explained description of the insertion process, the steps which are necessary for the process of disengaging or withdrawing the mobile telephone 100 from the holding device 200. The mobile telephone 100 is first to be displaced in the direction parallel to the holding surface 215 of the holding device 200 against the pressing element 340 with increasing force by the user. As soon as the displacement $\Delta Y_2$ required above is reached by applying the maximum required force $F_{max}$ the user can pivot the mobile telephone 100, by the head area 106 of the mobile telephone 100, out of the holding device 200 at the angle $\alpha$. If the user then reduces the force required for the displacement $\Delta Y$, the restoring force of the pressing element 340 causes the pushing out of the mobile telephone 100, whose longitudinal axis is pivoted by the angle $\alpha$ with respect to the holding surface 215 of the holding device 200. The pushing out of the mobile telephone 100 is in turn guided by the holding surface 215 and the foot holding bracket 260 in order to prevent tilting of the mobile telephone 100.

As described above, the inserted mobile telephone is held, with the aid of the element 340, between the pressing surface 320 and head-holding bracket 220 by the holding force $F_{hold}$ which results from the displacement $\Delta Y_3$ of the pressing surface 320 relative to the neutral position $Y_0$ in connection with the elastic properties of the elastic pressing element 340. The holding force $F_{hold}$ thus causes a mechanical fixation of the mobile telephone 100 in the holding device 200. In addition, the holding force $F_{hold}$ ensures that the electrical contact between the contact units 150 and 310 is maintained in a reliable manner. The contacts of the contact unit 150 or 310 can be spring-loaded.

The mechanical fixation of the mobile telephone 100 in the holding device 200 is, however, not static but dynamic. Referring to FIG. 2b it will be assumed that the holding device 200 is exposed to an impact. An impact of this type can, for example, occur during the operation in a motor vehicle when driving over a barrier, an uneven area, or a pothole. If the observer is in the inertial system of the holding device 200, an impact of this type appears as an acceleration $a_{shock}$, which acts at the center of mass of the mobile telephone 100. The acceleration $a_{shock}$ acts on the mobile telephone 100, which has a mass m, for a period of time $s_{shock}$. From the mass m and the acceleration $a_{shock}$, a force $F_{shock}$ results which acts against the holding force $F_{hold}$ of the elastic pressing element 340. In first approximation one obtains a displacing force $F_{down}$ from the difference of the force $F_{shock}$ and the holding force $F_{hold}$. The displacing force $F_{down}$ in turn causes an effective displacing acceleration adown which acts over the time $s_{shock}$ and accordingly leads to a displacement $\Delta Y_{off}$. By suitable choice of the holding force $F_{hold}$ or of the elastic properties of the pressing element 340, a maximum displacement $\Delta Y_{off}$ can be ensured in case of an impact (acceleration) to be maximally absorbed, said impact causing an effective acceleration $a_{down}$ to be maximally absorbed. The maximum displacement $\Delta Y_{off}$ is advantageously set in such a manner that it does not exceed the level $\Delta Y_1$ of the bracket of the head-holding bracket 220 taking into account of a predetermined safety margin $\Delta Y_{margin}$ ($\Delta Y_1 \geqq \Delta Y_{off} + \Delta Y_{margin}$). By calculations and simulations the elastic properties required for the pressing element 340 and the size of the displacement from the neutral position $Y_0$ can be determined.

For the determination of the elastic properties of the pressing element 340 and the size of the displacement $\Delta Y_3$ from the neutral position $Y_0$, one must also take into account the maximum force $F_{max}$ which must be applied by the user during the insertion process into, and the withdrawal process of the mobile telephone 100 out of, the holding device 200. The force $F_{max}$ to be applied should be chosen in regard to the one-handed handling by means of the index finger and thumb.

In conclusion, FIG. 3a shows a form of embodiment of the holding device according to the invention which is made of multiple parts. The multi-part or modular design of the holding device is advantageous if, for the functional parts of the holding device, different versions are available, each of which is adapted to different mobile telephones or their housing configuration. The modular design makes economical production possible through a combination of universal parts and parts in especially adapted versions.

The holding device according to the invention and according to the form of embodiment represented in FIG. 3 comprises a main tray 400, a coupling unit 410, a coupling holder 420, a foot tray 440 with a receptacle 445 for a pressing unit 450, the pressing unit 450, and an annular holder 430.

The coupling unit 410 serves for the inductive or capacitive coupling with the antenna of the mobile telephone. The main tray 400 comprises a receptacle 405 which is configured to accommodate the coupling unit 410 and the coupling holder 420. The free surface of the coupling holder 420, i. e. the surface directed outwards after the insertion of the coupling holder 420 into the receptacle 405 of the main tray 400, serves, as described above, as a holding surface with respect to the rear surface of the housing of the mobile telephone to be received. The main tray 400 is furthermore provided with a receptacle 406 which is suitable for the fixation of the foot tray.

The receptacle 445 of the foot tray 440 is configured so as to be suitable to accommodate the pressing unit 450. For this, the receptacle 445 can be formed, as represented in FIG. 3, either completely in the foot tray 440 or by affixing the foot tray 440 to the main tray 400. The pressing unit 450 comprises guide tracks 455 which can pre-assign a predetermined direction of displacement to the pressing unit 450 or its pressing plate. The guide tracks 455 can, for example, be realized by pins which engage in hollow guide elements so that a direction of displacement is defined.

The annular holder 430 can also be affixed to the main tray. The annular holder 430 preferably has, in a side view, the essentially U-shaped or V-shaped form represented, while the annular holder 430 in a plan view, i. e. in a view perpendicular to the side view represented, has an essentially closed, O-shaped, annular, elliptical, or frame-shaped form. According to the configuration of the annular holder 430 in its plan view, the annular holder 430 comprises the head-holding bracket 435 and possibly the foot-holding tray 436 in addition. Alternatively, the foot-holding tray 436 can be formed as a part of the foot tray 440.

The configuration of the annular holder 430 comprises in the area of the head-holding tray 435 as well as in the area of the foot-holding tray 436 lateral guides which are suitable to support a mobile telephone which is inserted into the holding device with the annular holder 430 on the sides, i. e. perpendicular to the longitudinal axis of the mobile telephone and parallel to the holding surface of the holding device.

As can be seen with reference to FIG. 3b, the described configuration of the annular holder 430 ensures that at least the operating elements or the display of the mobile telephone are freely accessible when the mobile telephone is inserted into the holding device. The front surface of the housing of the mobile telephone is only slightly covered by the head-holding brackets 435 or foot-holding brackets 436. Furthermore, the described configuration of the annular holder 430 ensures that, disposed on the sides, gripping surfaces of the mobile telephone are also freely accessible so that the previously described handling by the user can be done by using the thumb and the index finger.

The invention is not restricted to the represented or described forms of embodiment and embodiment examples. Rather, the invention also includes extensions of the invention in the framework of the claims. In particular, the invention can be provided with, instead of the described contact units 150 and 310, or in addition to them, additional or alternative interfaces for the transmission of data or signals. Thus, data transmission from the mobile telephone to external electronic devices can be done, for example, with the aid of infrared interfaces or wireless radio interfaces, such as, for example, Bluetooth interfaces.

LIST OF REFERENCE NUMBERS

100 Mobile telephone
105 Rear surface of the housing
106 Head area of the mobile telephone housing
107 Foot area of the mobile telephone housing
110 Earpiece or loudspeaker
120 Display
130 (ITU-T) keypad
140 Mouthpiece or microphone
150 Contact unit or multipoint connecting plug
160 Gripping surface
170 Antenna (internal)
200 Holding device
206 Head area of the holding device
207 Foot area of the holding device
210 Main tray
215 Holding surface
220 Head-holding bracket
230 Coupling unit
260 Foot-holding bracket
270 Limiting element
280 Foot tray
300 Pressing unit
310 Contact unit or multipoint connecting plug
320 Pressing surface
330 Flexible circuit board conductor
340 Elastic pressing element
400 Main tray
405 Receptacle for the coupling unit and the coupling holder
406 Receptacle for the foot tray
410 Coupling unit
420 Coupling holder
430 Annular holder
435 Head-holding bracket
440 Foot-holding bracket
445 Receptacle
450 Pressing unit
455 Guide tracks

The invention claimed is:

1. Holding device for a mobile telephone, said holding device comprising a holding surface, a head-holding bracket spaced from the holding surface, a pressing unit, in which the pressing unit comprises an elastic pressing element which is configured to exert, on a foot area of the mobile telephone, a holding force ($F_{hold}$) parallel to the longitudinal axis of the mobile telephone while the mobile telephone is held by the holding device so that a head area of the mobile telephone is pressed against the head-holding bracket, where the head-holding bracket and a foot holding bracket are furthermore provided to secure the mobile telephone on the holding surface against a force in the transverse direction, where the holding device is made of multiple parts and comprises an annular holder which is a part that is separable as a unit from the holding surface and which comprises at least the head-holding bracket and the foot holding bracket, and where the annular holder is formed, in a plan view, essentially in the form of a frame.

2. Holding device according to claim 1, in which the annular holder has, in a side view, an essentially U-shaped or V-shaped form.

3. Holding device according to claim 1, in which the holding device is composed of individual components, where the components comprise a main tray with a receptacle for a coupling unit and a coupling holder and with a receptacle for a foot tray, the pressing unit, and the annular holder.

4. Holding device according to claim 1, in which the pressing unit can be displaced against a restoring force if a displacing force is exerted on the pressing unit for the insertion of the mobile telephone at an acute angle ($\alpha$), where the angle ($\alpha$) is defined by the holding surface and the longitudinal axis of the mobile telephone and where the restoring force results from the displacement of the pressing element of the pressing unit.

5. Holding device according to claim 4, in which the pressing unit can be displaced by a predetermined displacement ($\Delta Y_2$) by the mobile telephone guided at an acute angle ($\alpha$) so that the mobile telephone can, by a pivoting motion, be pivoted into the holding device.

6. Holding device according to claim 1, in which the pressing unit, due to the pressing element having no force acting on it, is in a neutral position ($Y_0$) so that the pressing unit and the head-holding bracket are spaced from one another by a predetermined length ($Y_H$) which corresponds to the extension of the mobile telephone in the longitudinal direction less a predetermined difference in length ($\Delta Y_3$), where the displacement of the pressing unit by the predetermined difference in length ($\Delta Y_3$) has as a consequence the holding force ($F_{hold}$).

7. Holding device according to claim 4, in which the head-holding bracket has a level ($\Delta Y_1$) which is defined parallel with respect to the holding surface, where the level ($\Delta Y_1$) is less than the predetermined displacement ($\Delta Y_2$).

8. Holding device according to claim 1, in which the pressing element is adapted, in case of an impact which can be transmitted from the holding device to the inserted mobile telephone, to react elastically by the pressing unit being displaced by the mobile telephone as a consequence of the action of a force resulting from the impact so that the impact on the mobile telephone is dampened.

9. Holding device according to claim 1, in which the pressing unit comprises a contact unit which is suitable to electrically couple with a corresponding contact unit of the mobile telephone.

10. Holding device according to claim 9, in which the pressing unit comprises a flexible circuit board conductor which is electrically connected to the contact unit.

11. Holding device according to claim 1, in which the elastic pressing element has essentially the elastic properties of a spring.

12. Holding device according to claim 1, in which the holding device is configured in such a manner that gripping surfaces of the mobile telephone are disposed on the side and remain freely accessible.

13. Holding device according to claim 1 in which the holding device comprises a coupling unit which is configured to at least one of capacitively or inductively couple wireless signals with an antenna of the mobile telephone.

14. Holding device according to claim 9, wherein the contact unit is carried by and movable with the pressing unit.

* * * * *